W. B. HOYT.
COMBINED GAS AND WATER METER TESTER.
APPLICATION FILED SEPT. 15, 1910.
1,005,839.
Patented Oct. 17, 1911.
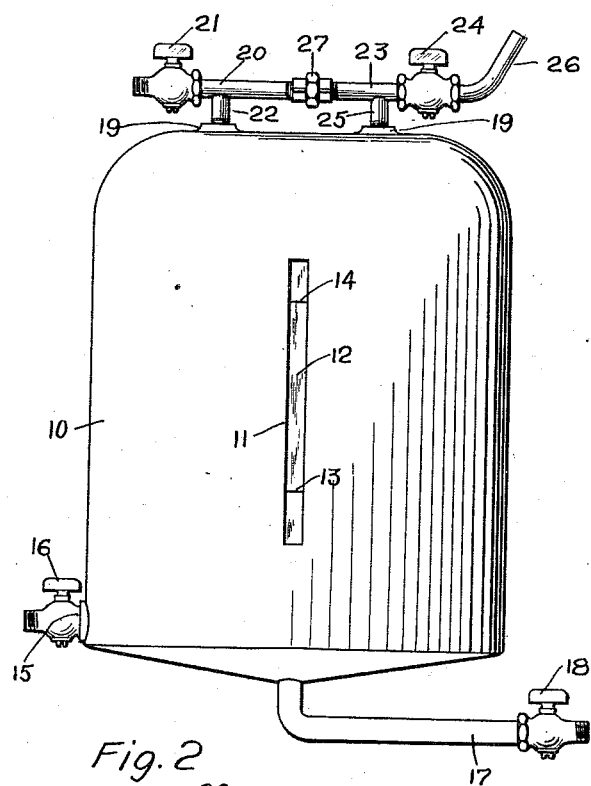
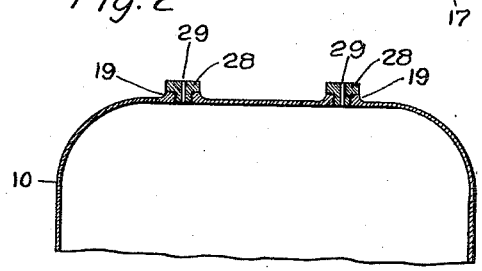
WITNESSES:
INVENTOR
Walter B. Hoyt
BY
ATTORNEY

UNITED STATES PATENT OFFICE.

WALTER B. HOYT, OF DARIEN, CONNECTICUT, ASSIGNOR OF ONE-HALF TO GEORGE E. CRAWFORD, OF BRIDGEPORT, CONNECTICUT.

COMBINED GAS AND WATER METER TESTER.

1,005,839.  Specification of Letters Patent.  Patented Oct. 17, 1911.

Application filed September 15, 1910. Serial No. 582,271.

*To all whom it may concern:*

Be it known that I, WALTER B. HOYT, a citizen of the United States, residing at Darien, county of Fairfield, State of Connecticut, have invented an Improvement in Combined Gas and Water Meter Testers, of which the following is a specification.

This invention has for its object to provide a simple, accurate and inexpensive tester for either gas or water meters which may be easily and quickly attached to a meter and will, in a moment's time, correctly indicate the accuracy or inaccuracy of either a gas or water meter.

With these ends in view I have devised the novel testing apparatus which I will now describe, referring to the accompanying drawing forming a part of this specification and using reference characters to indicate the several parts.

Figure 1 is an elevation of my novel testing apparatus complete; and Fig. 2 is a detail sectional view showing an arrangement with certain parts removed that may be used when only water meters are to be tested.

10 denotes a reservoir having a capacity in the present instance of something more than a cubic foot, for example a capacity of one and one-half cubic feet, more or less. The reservoir is provided with a suitable indicator, for example a vertical slot 11 covered on its inner side by a glass 12 which is hermetically secured in place and is provided with two gage marks, indicated respectively by 13 and 14, for purposes presently to be described.

15 denotes a hub for the attachment of a water supply pipe which opens into the reservoir and is provided with a cock 16.

17 denotes a water discharge pipe which leads from the bottom of the reservoir and is provided with a cock 18. On the top of the reservoir are two hubs 19 which are internally threaded to receive gas pipes.

20 denotes a gas supply pipe which is provided with a cock 21 and a branch 22 which is externally threaded to engage one of the hubs 19, in the present instance the left hub.

23 denotes a gas discharge pipe which is provided with a cock 24, with a branch 25 which is externally threaded to engage one of the hubs 19, in the present instance the right hub, and the outer end of which is preferably turned upward as at 26. The inner ends of pipes 20 and 23 are connected by a union 27 after the branches have been turned to place.

When the tester is to be used upon water meters only, pipes 20 and 23 may be disconnected from the reservoir, as in Fig. 2, and screw plugs 28 may be turned into hubs 19, one or both of said screw plugs being provided with vents 29.

The operation is as follows: Suppose that the device is to be used to test a gas meter. Connection is made by means of a flexible tube (not shown), or otherwise, between gas supply pipe 20 and the source of supply on the near side of the meter. Connection is also made by a flexible pipe (not shown), or otherwise, between hub 15 and a source of water supply. Cock 17 in the water discharge pipe is closed, cock 24 in the gas discharge pipe is opened and cock 16 is opened and water is permitted to enter the reservoir until it just reaches gage mark 13. Cocks 16 and 24 are then closed and cock 21 is opened. This permits gas to enter and fill the reservoir through the branches 22 and 25. Gage mark 13 is accurately placed so that when the reservoir is filled with water up to said gage mark the remaining capacity of the reservoir will be just what has been predetermined, in the present instance a capacity of one cubic foot. By noting the reading of the meter before and after the admission of gas to the reservoir, as just described, the operator may learn whether the accurately measured cubic foot of gas that has entered the reservoir has caused a greater or less indication at the meter. As soon as the reservoir is filled with gas, cock 21 is closed and if it is desired to clear the reservoir cock 24 may be opened and a match applied to the upturned end of pipe 23 to burn off the gas. The operation of measuring a cubic foot of gas in the reservoir may be repeated as many times as desired to test the accuracy of the working of the meter. Suppose now that it is desired to use the device to test a water meter. Pipes 20 and 23 may remain in place or they may be removed and screw plugs 28 substituted as preferred. If pipes 20 and 23 are not removed, cock 24 is used as a vent. Connection is made by means of a flexible pipe (not shown), or otherwise, between hub 15 and the water supply on the near side of the meter. Cock 17 is closed, cock 24 is opened and then cock 16 is opened and water is allowed to pass into the reservoir until it just reaches gage mark 14, said gage mark being accurately placed so that when the water reaches said mark the quantity of water in the reservoir will be just what has been predetermined, for example—one cubic foot. By noting the reading of the meter before and after the admission of water to the reservoir, as just described, the operator may learn whether the accurately measured cubic foot of water that has entered the reservoir has caused a greater or less indication at the meter. As soon as a cubic foot of water has been measured in the reservoir, cock 17 may be opened to clear the reservoir. The operation of measuring a cubic foot of water in the reservoir may be repeated as many times as desired to test the accuracy of the working of the meter.

Having thus described my invention I claim:

A combined gas and water meter tester comprising a reservoir, means at one end of the reservoir for admitting and discharging water, a pipe having branches leading into the other end of said reservoir, said pipe being provided with a gas inlet and a gas outlet, a burner connected with said outlet, and an indicator provided with gage marks to indicate predetermined volumes of water and gas entering the respective ends of the reservoir.

In testimony whereof I affix my signature in presence of two witnesses.

WALTER B. HOYT.

Witnesses:
   Geo. A. Kilborn,
   W. H. Squire.

---

Copies of this patent may be obtained for five cents each, by addressing the "Commissioner of Patents, Washington, D. C."